Patented July 2, 1940

2,206,719

UNITED STATES PATENT OFFICE 2,206,719

FERMENTED LIQUOR

Richard M. Draeger, Beaver Dam, Wis.

No Drawing. Application March 27, 1939,
Serial No. 264,486

3 Claims. (Cl. 99—30)

The invention relates to improvements in fermented liquors and particularly to the production of a flavored fermented alcoholic beverage.

An object of the invention is to produce a fermented liquor having as its base a fermented solution but none of its original natural taste or odor.

Another object is to provide an effective process for conditioning and flavoring a solution extracted from a fermented mixture, in which the natural odor and flavor have been eliminated.

Another object is to provide a simple and effective process for producing fermented liquors.

The foregoing and such other objects of the invention as will appear hereinafter will be more readily understood from a perusal of the following specification:

The invention relates to a fermented alcoholic liquor, containing as its principal ingredient a fermented solution which has been treated to activated carbon to remove substantially all of its original natural odor and taste, and then carbonated and flavored.

By activated carbon, as used herein, is meant those special carbons which are produced by treating charcoal or by charring wood in the presence of substances like zinc chloride or by similar activating processes.

It has been found by extensive experimentation; such as, subjecting a fermented beer wort or other fermented solution to a predetermined quantity of activated carbon, that not merely the objectionable odors and tastes of fermentation are removed, but also all of the original natural odors and tastes, leaving a practically neutral or substantially unflavored odorless fermented solution. This neutral fermented solution is then carbonated and any suitable flavoring substance is added to produce a fermented liquor having a true flavor which may be bottled and distributed in individual packages like other known bottled beverages.

Although, primarily, it is intended that beer wort, brewed in the customary manner and then rendered neutral by treating it with activated carbon, forms the principal ingredient for the present fermented liquor, it will be obvious that any fermented solution may be similarly treated after having substantially all its natural tastes and odors removed.

Therefore, the present invention concerns itself primarily with neutralizing a fermented brew and then adding any desirable flavoring substance to produce a fermented alcoholic beverage having the characteristics of liquor rather than those of beer, but devoid of the high alcoholic content of a liquor.

The process for producing a liquor, having as its principal ingredient a fermented hopped-wort (beer wort) solution, is illustrated by the following example:

Although beer wort may be produced by any of the many well understood processes, one method is, to put about 34 lbs. of crushed malt in 12½ gallons of water at a water temperature of 28° R. Either brewers' malt or distillers' malt may be used, although it is preferable to use the latter because of its greater diastasic power. This mixture, together with about ¼ lb. of calcium sulphate and $\frac{1}{10}$ lb. of lactic acid, is agitated in a mash tun where the temperature is raised within 15 minutes to 38° R. The mixture then is allowed to stand and the temperature is held constant. After standing about 30 minutes, the mixture is mashed and the temperature raised, within ten minutes, to 48° R. About 12½ lbs. of corn flakes are then added and, when dissolved, the mixture is mashed slowly at about 48° R. for about 15 or 20 minutes.

The agitator in the mash tun is then operated slowly for about 25 or 30 minutes while the temperature is slowly increased to 59° R. During this agitation, the mixture is thoroughly mashed to convert all the starch in the mash. The agitator is then stopped and the mixture is allowed to stand and settle for about 35 minutes after which period the extractive wort solution is drawn off into a clean kettle and boiled vigorously for about one hour.

If desired, about ⅕ of a pound of hops may be added and the hopped-wort boiled for approximately another hour and then allowed to cool. When the temperature reaches approximately 15° F. about ½ lb. brewers' yeast is added and the whole is allowed to ferment while the room temperature is kept at about 80° F. After fermenting from 40 to 48 hours, about 46 lbs. of dextrose (sugar) is added to the partially fermented hopped-wort and fermentation is allowed to continue until the end point of fermentation is reached. The resulting product is beer wort.

The length of time required for fermentation may be shortened by reducing the malt content and proportionally increasing the dextrose content or by adding one-half of the dextrose to the hopped-wort on about the fourth day of fermentation and the balance on the sixth day.

After the beer wort has stood for about twelve hours, it is placed in an open vessel equipped with an agitator and about 1 lb. of activated carbon is added. The mixture is agitated for about one hour. After settling for about twelve hours, the beer wort is filtered and cooled down to about 1° R.

As a result of this treatment, the beer wort has lost substantially all of its original natural odor and taste and is neutral. This fermented solution, or neutral beer wort, constitutes a principal ingredient in the present fermented liquor and is referred to hereinafter as the "base."

The base constitutes a mixture of alcohol and water and, except for its smaller alcoholic content, it is identical to the product that comes from distilling a fermented mash. It is then carbonated with about three volumes of gas.

To produce a flavored fermented liquor, 1½ oz. of soluble dry gin flavor, for example, may be added to one barrel of "base" and the resulting liquor will be, in effect, that of gin and charged water. Or, 5½ gallons of cocoa cola syrup may be added to one barrel of the "base" to produce, in effect, a cocoa cola highball. Similarly, other fruit syrups or extracts may be added in proper proportions to produce a fermented liquor having the character of a fruit highball.

It is preferable that the fruit syrups or extracts used be free of alcohol so as not to increase the alcoholic content of the liquor over that normally produced by the fermentative process, which will be about 11% by weight or 13½% by volume.

The flavored fermented liquor may be bottled or packed in bulk for distribution. For example, when flavored with Coca-Cola or fruit syrup, the proportion, in a six ounce package will be 5½ ounces of "base" to ½ ounce of syrup. Obviously, the liquor has been pasturized and as each bottle contains but one drink, sanitation is maintained after its distribution.

To produce an all dextrose "base," 77 lbs. of dextrose may be added, all at once, to one barrel of boiling water containing ¼ lb. calcium sulphate and ⅟₂₀ lb. lactic acid, and then boiled for two hours. If desired, one-fifth lb. of hops may be added after the aforesaid mixture has been boiled for about one hour. After the mixture has cooled down to about 15° R., ½ lb. of brewers' yeast is added and the mixture is set to ferment in a room temperature of about 80° F. After fermenting from 40 to 48 hours, about 46½ lbs. of dextrose is added and the whole is allowed to ferment about 10 days or until it reaches its end point of fermentation. If a more rapid rate of fermentation is desired the 77 lbs. of dextrose may be added gradually in smaller quantities, such as, about 10 lbs. per day during fermentation.

The fermented mix is allowed to stand for about 12 hours and is then placed in a vessel containing an agitating device and then one lb. of pulverized activated carbon is added. After agitating for about one hour the mix is allowed to stand for about 12 hours and then is filtered and cooled down to about 1° R. The resulting solution, which now is odorless and has a neutral taste, constitutes the "base" for further processing. The base is then carbonated with about three volumes of gas and flavored as previously outlined, to produce the fermented liquor.

Another "base" may be produced by treating a fermented fruit juice or wine to activated carbon to remove substantially all of its original taste and odor. As for example, the juice of about 300 lbs. of fruit, such as grapes, is boiled down and then cooled to about 12° R. and placed in a clean tank in a fermenting cellar. About ½ lbs. of very high attenuating yeast is added and fermentation is allowed to set in. On about the fifth day, about 26 lbs. of dextrose is added and in about twelve to fourteen days the end point of fermentation is reached.

This time may be shortened by adding the dextrose gradually in small quantities during the fermentive process.

The fermented solution is then placed in a clean vessel equipped with an agitating device and about 1 lb. of activated carbon is added. After standing over night, the solution is filtered and cooled down to about 1° R. A neutral "base" results, which is carbonated and flavored as hereinbefore described.

While pure dextrose is perhaps preferable, and most widely used in the industry, it should be understood that any sugar, such as molasses, syrup, glucose, etc., may be substituted therefor in adequate proportions wherever such sugars are indicated and, therefore, the term "dextrose" as used herein is intended to embrace such substitute sugars as are available or preferable.

One advantage in neutralizing the beverage and subsequently flavoring is: that, the final product has a true natural flavor as distinguished from the fermentive taste present in most fermented beverages.

Although several mixtures from which the "base" may be produced have been outlined in all their steps, it should be understood, as noted hereinbefore, that any fermented mash or aqueous solution may be treated to a sufficient quantity of activated carbon to remove substantially all of its natural odors and tastes and then be carbonated and flavored to provide a fermented liquor having all the characteristics, except as to alcoholic content, of a distilled fermented mash, and it is therefore, not desired to limit the invention to the examples elected for the purpose of disclosure except insofar as such examples are specifically recited in certain of the appended claims.

I claim:

1. A process, for making a fermented liquor, consisting of treating a fermented solution with activated carbon to remove substantially all of its natural odor and flavor to produce a neutral tasting solution, carbonating said neutral solution, and adding a flavoring agent.

2. A process, for making an alcoholic beverage, consisting of treating a fermented dextrose solution with activated carbon to produce a substantially tasteless extract and then carbonating and flavoring said extract.

3. A process, for making an alcoholic beverage, consisting of adding dextrose to a fermenting fruit juice and after fermentation ceases treating the solution with activated carbon to substantially free it of certain odors and tastes to produce a neutral tasting base, carbonating said base, and then flavoring the carbonated base.

RICHARD M. DRAEGER.